US010520161B1

(12) United States Patent
Wei

(10) Patent No.: US 10,520,161 B1

(45) Date of Patent: Dec. 31, 2019

(54) AUTOMOBILE LAMP

(71) Applicant: JUTE INDUSTRIAL CO., LTD., Taichung (TW)

(72) Inventor: Shih-Chieh Wei, Taichung (TW)

(73) Assignee: JUTE INDUSTRIAL CO., LTD., Taichung (TW)

( * ) Notice: Subject to any disclaimer, the term of this patent is extended or adjusted under 35 U.S.C. 154(b) by 0 days.

(21) Appl. No.: 16/242,853

(22) Filed: Jan. 8, 2019

(51) Int. Cl.

| | |
|---|---|
| ***B60Q 1/04*** | (2006.01) |
| ***F21V 5/04*** | (2006.01) |
| ***F21V 19/00*** | (2006.01) |
| ***F21V 31/00*** | (2006.01) |
| *F21Y 105/18* | (2016.01) |
| *F21Y 115/10* | (2016.01) |

(52) U.S. Cl.

CPC .......... *F21V 5/045* (2013.01); *F21V 19/0035* (2013.01); *F21V 31/005* (2013.01); *F21Y 2105/18* (2016.08); *F21Y 2115/10* (2016.08)

(58) Field of Classification Search

None

See application file for complete search history.

(56) References Cited

U.S. PATENT DOCUMENTS

| | | | | |
|---|---|---|---|---|
| 7,813,055 | B2 * | 10/2010 | Yasumoto ................ | G02B 3/10 359/742 |
| 9,466,773 | B2 * | 10/2016 | Streppel .................. | F21V 5/045 |
| 2010/0284194 | A1 * | 11/2010 | Miyashita ................. | F21V 5/04 362/311.09 |
| 2018/0231209 | A1 * | 8/2018 | Schwalenberg ........ | F21V 5/045 |

* cited by examiner

*Primary Examiner* — Elmito Breval

(74) *Attorney, Agent, or Firm* — Muncy, Geissler, Olds & Lowe, P.C.

(57) ABSTRACT

An automobile lamp includes a lamp seat, a lighting unit, and a light guiding member. The lighting unit is positioned on the lamp sear. The light guiding member is disposed on the lamp seat and covers the lighting unit. The light guiding member is formed with a plurality of ribs thereon. The ribs form a corrugated structure along the radial direction of the light guiding member. When a plurality of light beams are emitted from the lighting unit into the light guiding member, part of the light beams travels along the corrugated structure.

10 Claims, 9 Drawing Sheets

AUTOMOBILE LAMP

BACKGROUND OF THE INVENTION

Field of the Invention

The present invention relates to an automobile lamp.

Description of the Prior Art

Conventional automobile lamp has a reflection face to reflect the light beams emitted from lighting members at specific positions to further emit outward through a lamp cover, or has a light guiding member to gather light beams or to make the light beams travel further.

However, the light beams are simple and monotonous to lack of identification.

SUMMARY OF THE INVENTION

The main object of the present invention is to provide an automobile lamp which is able to provide 3D light beams with gradation.

To achieve the above and other objects, the automobile lamp includes a lamp seat, a lighting unit, and a light guiding member.

The lighting unit includes a circuit board and a plurality of LEDs. The circuit board is disposed on the lamp seat. The LEDs is electrically connected to the circuit board respectively. The light guiding member is disposed on the lamp seat and covers the lighting unit. The light guiding member has a first face and a second face opposite to the first face. The first face is flat and faces a plurality of lighting portions of the LEDs. A plurality of ribs are formed on the second face. The ribs form a corrugated structure along a radial direction of the light guiding member. When a plurality of light beams from the lighting portions emit through the first face into the light guiding member, part of the light beams further travel along the corrugated structure.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
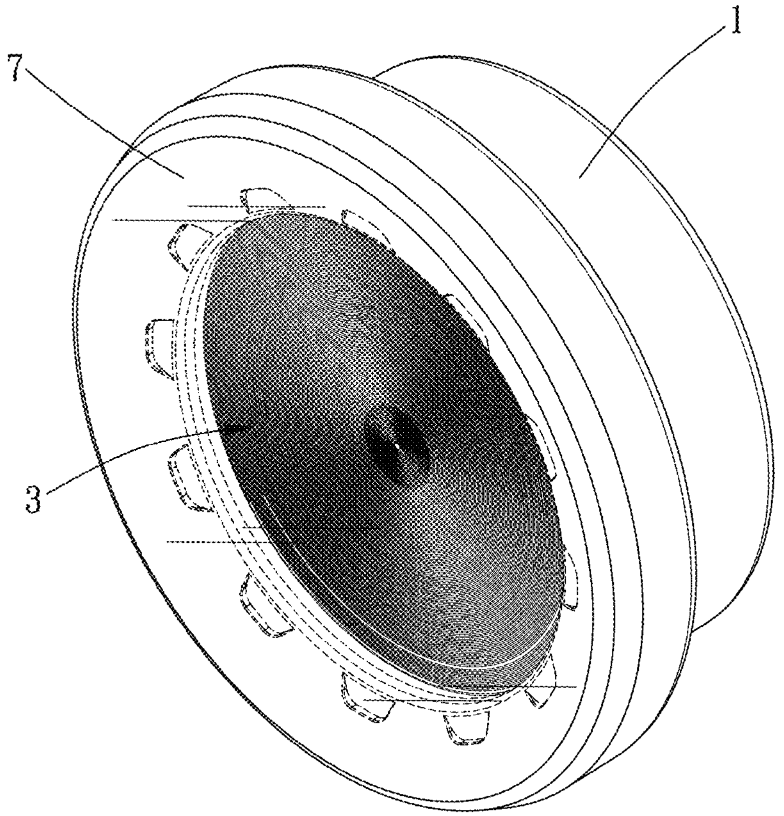
FIG. 1 is a stereogram of the present invention.
Figure 2:
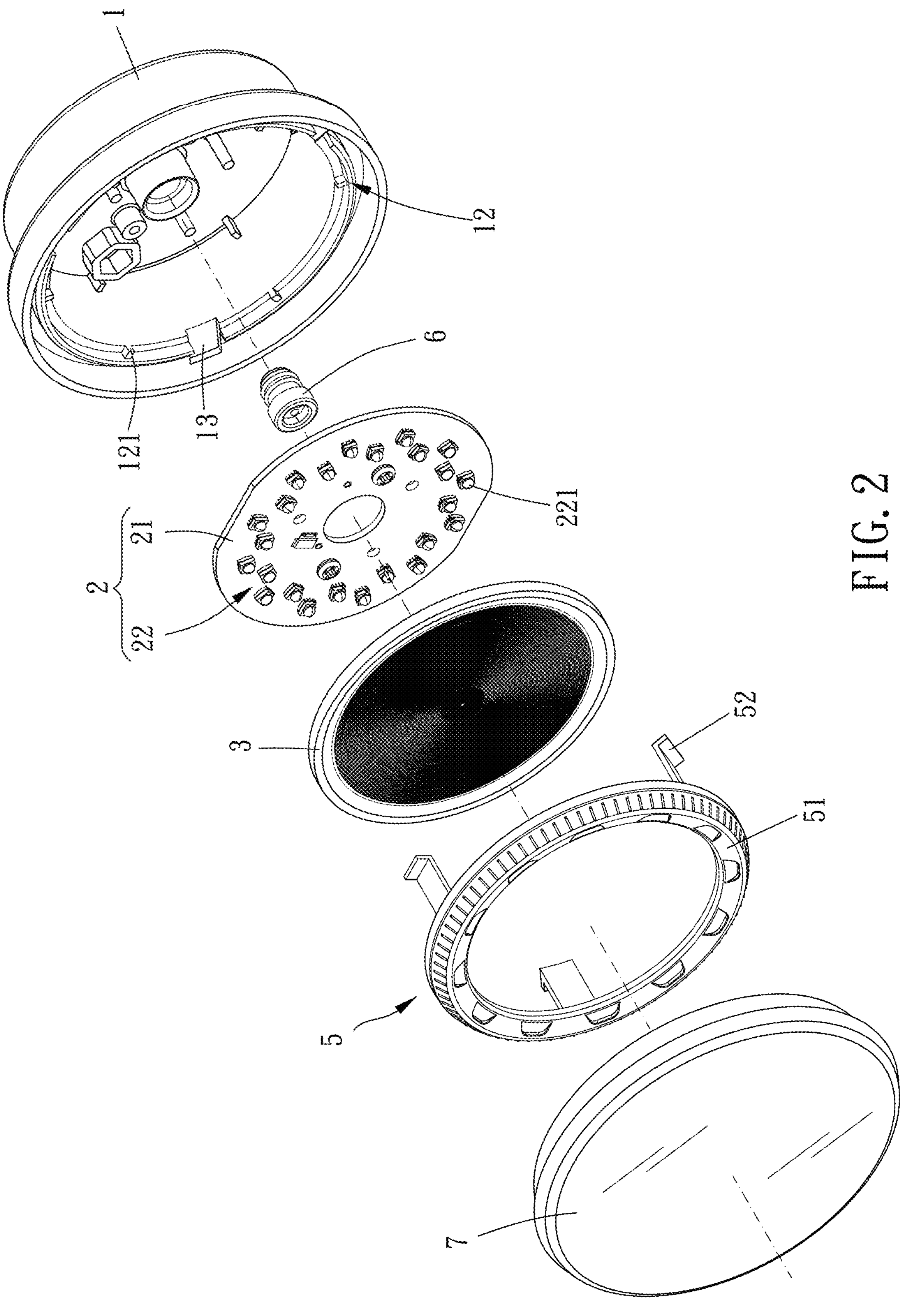
FIG. 2 is a breakdown drawing of the present invention.
Figure 3:
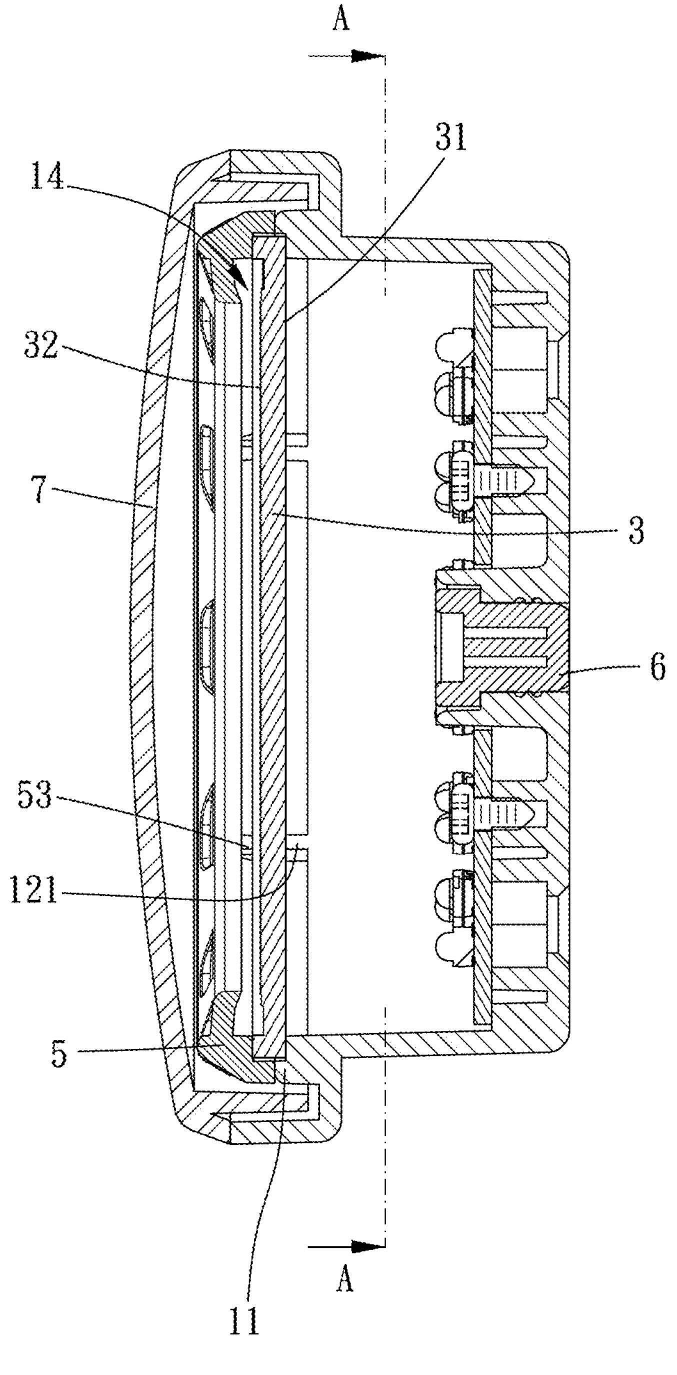
FIG. 3 is a lateral cross-section drawing of the present invention.
Figure 4:
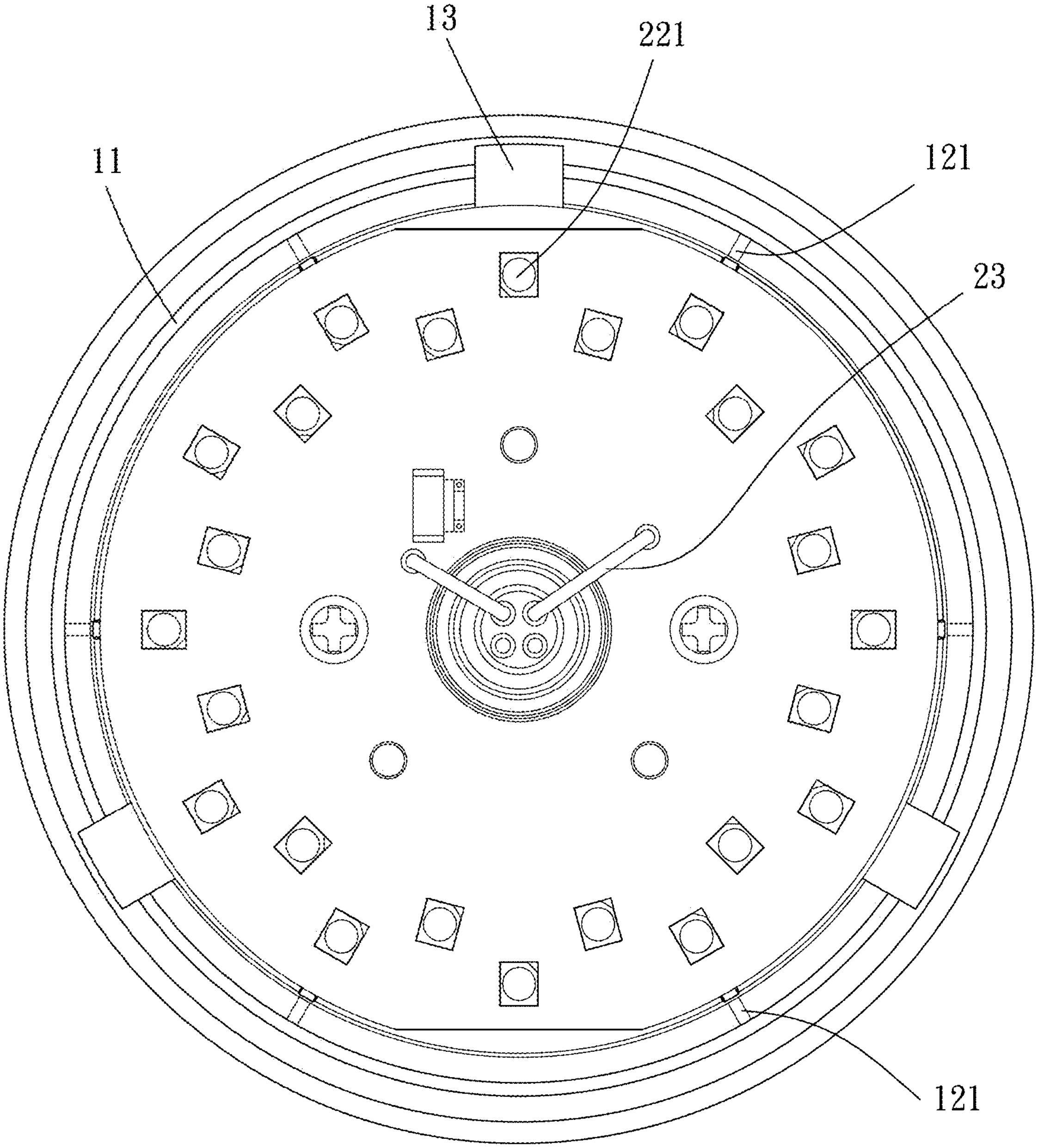
FIG. 4 is a top view of the present invention without a light guiding member.
Figure 5:
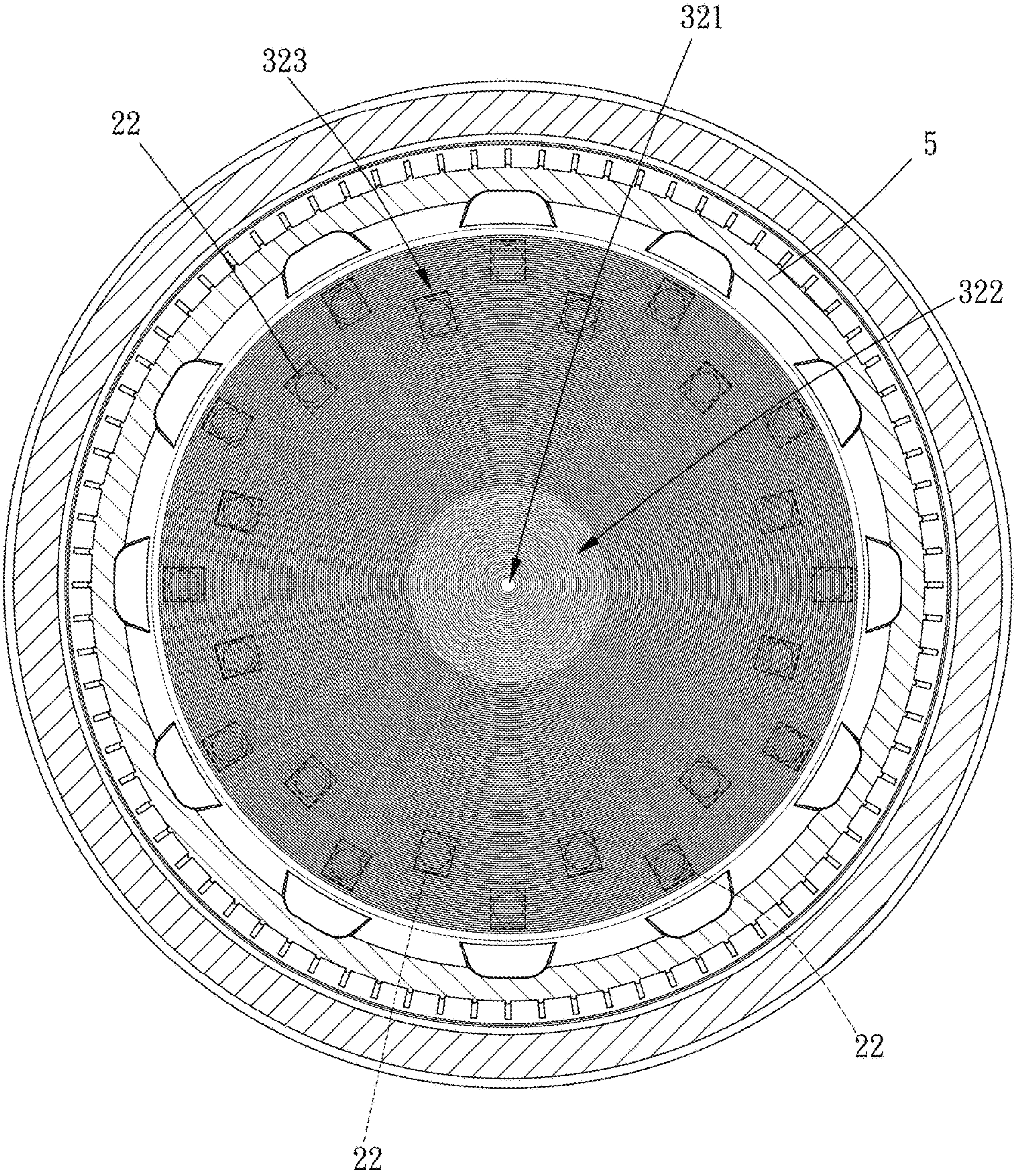
FIG. 5 is an A-A cross-section drawing of FIG. 3 of the present invention.
Figure 6:
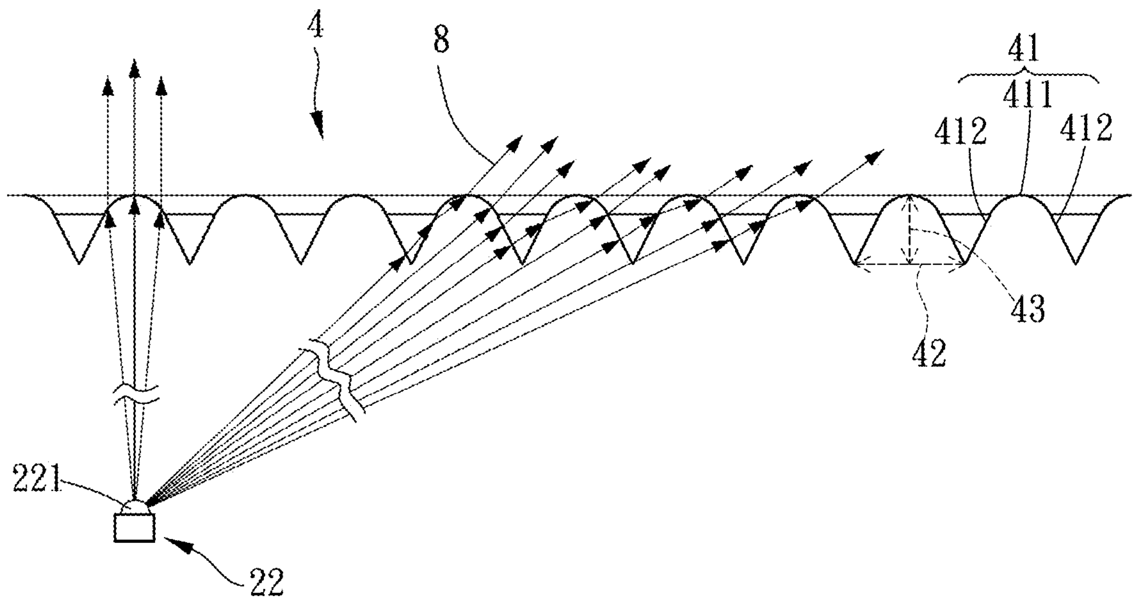
FIG. 6 is an illustration of refraction showing light beams from LEDs into a light guiding member of the present invention.
Figure 7:
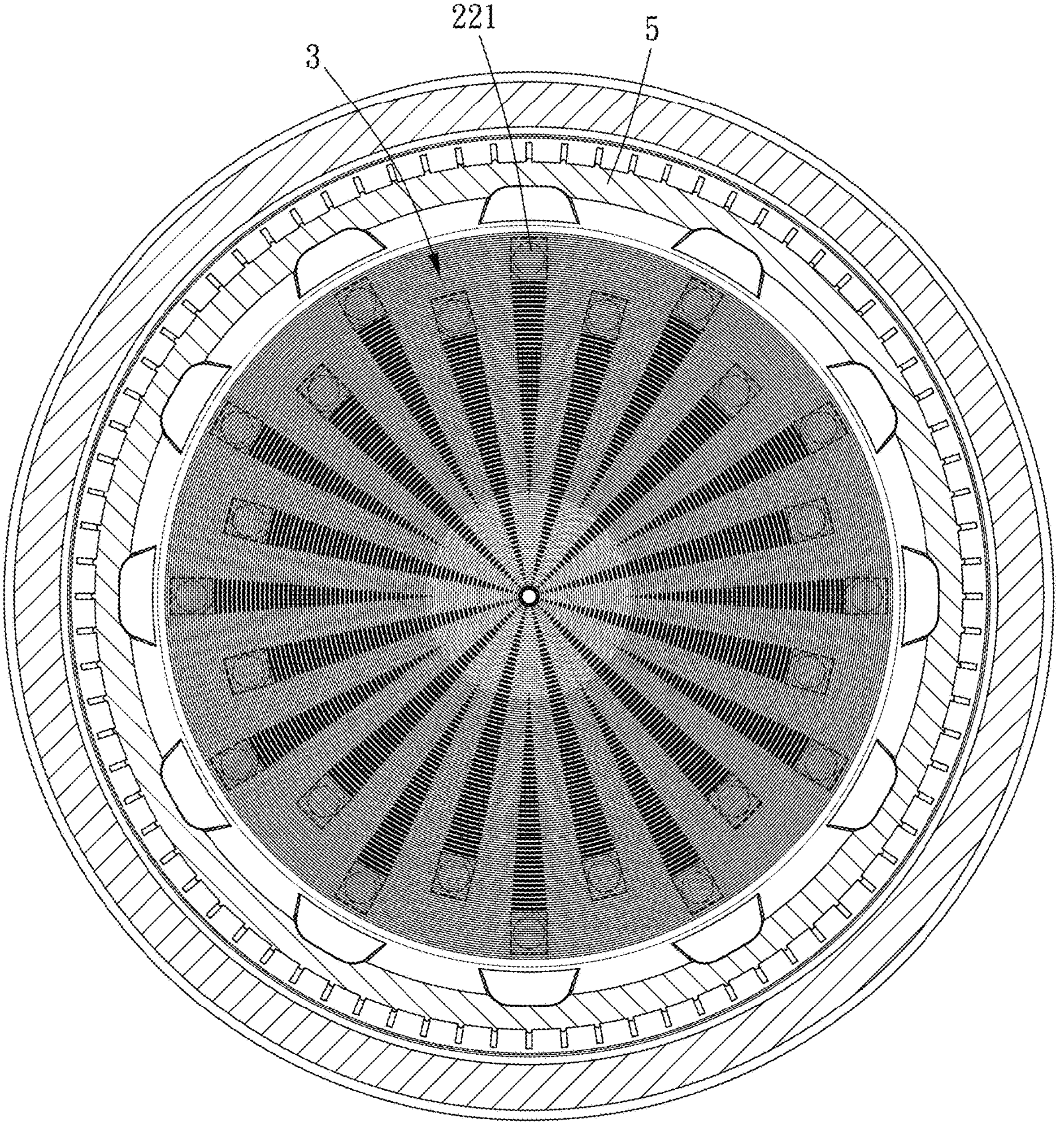
FIG. 7 is an illustration of the present invention.
Figure 8:
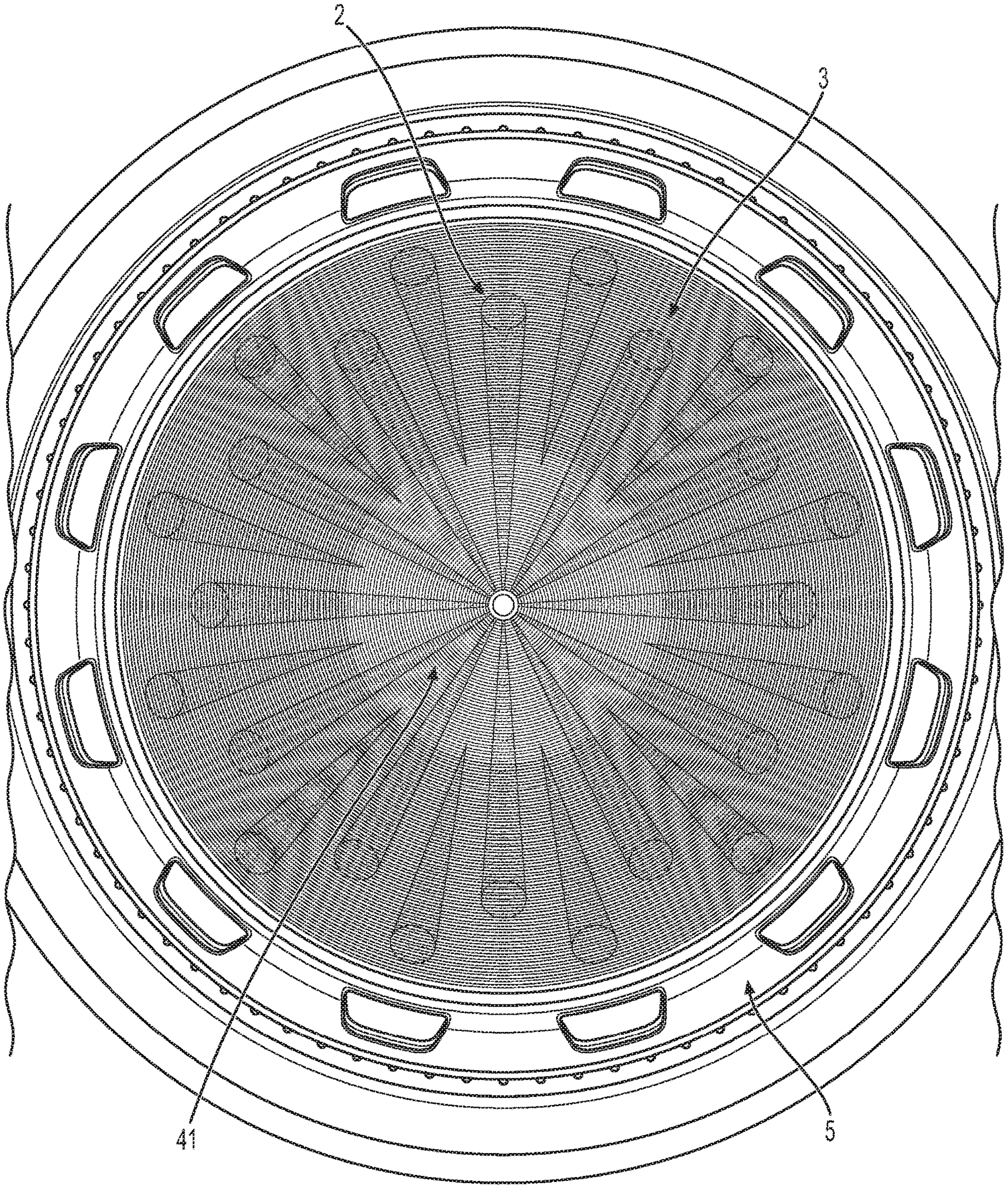
FIG. 8 and FIG. 9 are pictures of a sample of the present invention.
Figure 9:
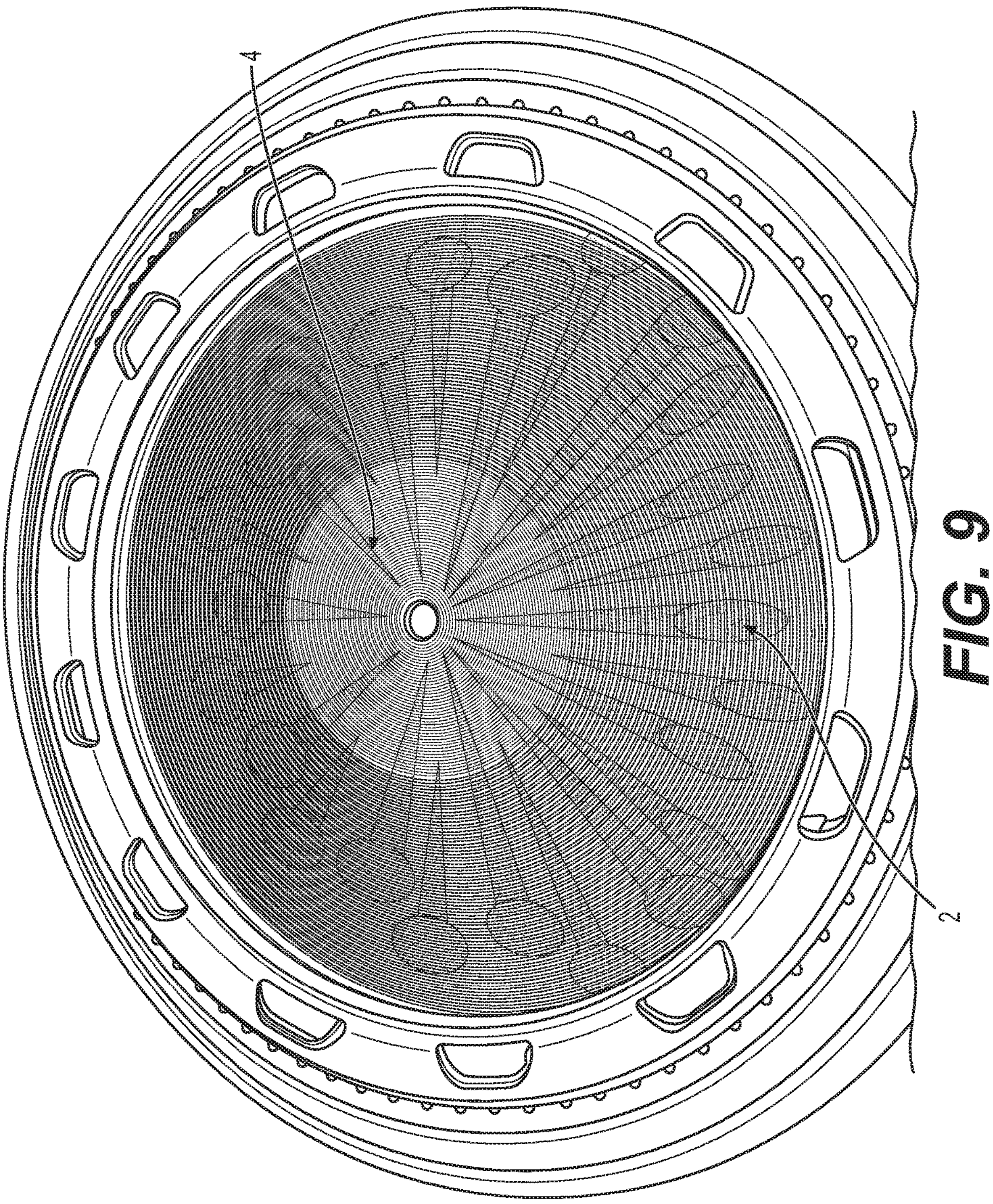

Please refer to FIG. 1 to FIG. 9, the automobile lamp of the present invention includes a lamp seat 1, a lighting unit 2, and a light guiding member 3.

The lighting unit 2 includes a circuit board 21 and a plurality of LEDs 22. The circuit board 21 is disposed on the lamp seat 1. The LEDs 22 is electrically connected to the circuit board 21 respectively. The light guiding member 3 is disposed on the lamp seat 1 and covers the lighting unit 2. The light guiding member 3 has a first face 31 and a second face 32 opposite to the first face 31. The first face 31 is flat and faces a plurality of lighting portions 221 of the LEDs 22. A plurality of ribs 41 are formed on the second face 32. The ribs 41 form a corrugated structure 4 along a radial direction of the light guiding member 3.

When a plurality of light beams 8 from the lighting portions 221 emit through the first face 31 into the light guiding member 3, part of the light beams 8 further travel along the corrugated structure 4. For example, the light beams 8 refract and travel toward the center of the light guiding member 3. Besides, the number of the light beams 8 traveling along the radial direction of the light guiding member 3 via the corrugated structure 4 is reduced toward a direction away from the lighting portions 221. That is, the brightness is reduced, and the width of light beam is reduced too so that the light beam is gradational and directional. The light beams form a complete light pattern. In addition, the light beams transform according to the angle of observer to make the light beams float. That is, the light beams form different patterns when observed from different positions.

Specifically, the ribs 41 are aligned along the radial direction of the light guiding member 3. Each of the ribs 41 has a rib crest 411 and two rib slopes 412. An end of each of the rib slopes 412 is connected to the rib crest 411. An other end of each of the rib slopes 412 is connected to one of the rib slopes 412 of an adjacent one of the ribs 41. That is, the corrugated structure 4 is wavy along the radial direction of the light guiding member 3 so that the light beams 8 from LEDs 22 at the same radial position but different circumferential positions have the same pattern during refraction to make it easier to design.

More specifically, a length of a bottom 42 of each of the ribs 41 is defined as a maximum linear distance between the two ribs 41 along the radial direction of the light guiding member 3. A rib height 43 of each of the ribs 41 is defined as a maximum linear distance between the rib crest 411 and the bottom 42 along the radial direction of the light guiding member 3. When a ratio of the rib height 43 to the length of the bottom 42 is ranged between 0.5-0.7, and a ratio of a vertical distance between the first face 31 and the second face 32 to a vertical distance between the first face 31 to the lighting portions 221 along the axial direction of the light guiding member 3 is ranged 0.15-0.3, the refraction of the light beams 8 form a preferable pattern. In the present embodiment, each of the rib crests 411 has an arc-shaped contour in a radial cross-section of the light guiding member 3, and each of the rib slopes 412 is linear in a radial cross-section of the light guiding member 3. A ratio of a radius of curvature of the rib crest 411 to the length of each of the rib slopes 412 is ranged 0.8-1.4

In the present embodiment, the light guiding member 3 is disc-shaped. The ribs 41 are arranged on the second face 32 as concentric circles. The ribs 41 partition the second face 32 into a first zone 321, a second zone 322, and a third zone 323. The first zone 321 is circle-shaped. Each of the second zone 322 and the third zone 323 is ring-shaped. The second zone 322 is located between the first zone 321 and the third zone 323. The first zone 321 is flat and smooth. Each of the second zone 322 and the third zone 323 has a plurality of the ribs 41. Each of the ribs 41 in the second zone 322 has a rib height 43 vary from a rib height 43 of each of the ribs 41 in the third zone 323. Thereby, the light beams form a 3D pattern.

Specifically, when observing along the radial direction of the light guiding member 3, the LEDs 22 are located closed to a periphery of the second face 32. The LEDs 22 are arranged about a central axis and form a plurality of annular layers. For example, the LEDs 22 are arranged along the circumferential direction of the light guiding member 3 to be concentric circles. Thereby, the light beams form a pattern with gradation toward the center.

In the present embodiment, the LEDs 22 are arranged spacedly along both the radial direction and a circumferential direction of the light guiding member 3. In other words, the LEDs 22 are arranged alternately. When observing laterally and obliquely, the LEDs 22 look like shining stars emitting light beams upward toward the center to form a light cone.

Specifically, the automobile lamp further includes a frame 5. The frame 5 is ring-shaped. The lamp seat 1 further includes a support portion 11. The frame 5 is positioned to the support portion 11 to enclose a receiving space 14 between the frame 5 and the support portion 11. The light guiding member 3 is restricted in the receiving space 14. More specifically, the support portion 11 includes a support unit 12 and a plurality of recesses 13. The light guiding member 3 is arranged on the support unit 12. The frame 5 includes a main body 51 and a plurality of coupling portions 52 connected to the main body 51. The main body 51 and the support unit 12 clamp the light guiding member 3. The coupling portions 52 are coupled to the recesses 13.

In the present embodiment, the recesses 13 include three said recesses 13 arranged isometrically, and the coupling portions 52 include three said coupling portions 52 arranged isometrically. The support unit 12 includes six first positioning pins 121. A pair of the first positioning pins 121 is arranged between any two adjacent ones of the recesses 13 along the circumferential direction of the light guiding member 3. The main body 51 is extended with six second positioning pins 53. The second positioning pins 53 correspond to the first positioning pins 121 respectively. Thereby, the light guiding member 3 is firmly clamped and positioned.

Preferably, the automobile lamp further includes a sealing plug 6 and a lamp cover 7. The sealing plug 6 is inserted through and positioned to the lamp seat 1. A wire 23 of the circuit board 21 is inserted through the sealing plug 6 to connect to a power supply. The sealing plug 6 can prohibit water from entering the lamp seat 1. The lamp cover 7 covers the light guiding member 3 and is positioned on the lamp seat 1 to protect the light guiding member 3.

In conclusion, the automobile lamp of the present invention can provide light beams with gradation extending toward the center, and the light beams refracted by the light guiding member form a cone-shaped pattern. In addition, the pattern of light beams varies when observing at different positions.

What is claimed is:

1. An automobile lamp, including:

a lamp seat;

a lighting unit, including a circuit board and a plurality of LEDs, the circuit board being disposed on the lamp seat, the LEDs being electrically connected to the circuit board respectively;

a light guiding member, disposed on the lamp seat and covering the lighting unit, having a first face and a second face opposite to the first face, the first face being flat and facing a plurality of lighting portions of the LEDs, a plurality of ribs being formed on the second face, the ribs forming a corrugated structure along a radial direction of the light guiding member;

wherein when a plurality of light beams from the lighting portions emit through the first face into the light guiding member, part of the light beams further travel along the corrugated structure.

2. The automobile lamp of claim 1, wherein a number of the light beams traveling along the radial direction of the light guiding member via the corrugated structure is reduced toward a direction away from the lighting portions.

3. The automobile lamp of claim 1, wherein the ribs are aligned along the radial direction of the light guiding member, each of the ribs has a rib crest and two rib slopes, an end of each of the rib slopes is connected to the rib crest, an other end of each of the rib slopes is connected to one of the rib slopes of an adjacent one of the ribs.

4. The automobile lamp of claim 3, wherein a length of a bottom of each of the ribs is defined as a maximum linear distance between the two ribs along the radial direction of the light guiding member, a rib height of each of the ribs is defined as a maximum linear distance between the rib crest and the bottom along the radial direction of the light guiding member, a ratio of the rib height to the length of the bottom is ranged between 0.5-0.7.

5. The automobile lamp of claim 4, wherein a number of the light beams traveling along the radial direction of the light guiding member via the corrugated structure is reduced toward a direction away from the lighting portions; when observing along the radial direction of the light guiding member, the LEDs are located closed to a periphery of the second face; the LEDs are arranged about a central axis and form a plurality of annular layers; the LEDs are arranged spacedly along both the radial direction and a circumferential direction of the light guiding member; the automobile lamp further includes a frame, the lamp seat further has a support portion, the frame is disposed on the support portion to enclose a receiving space between the frame and the support portion, the light guiding member is restricted in the receiving space; the support portion includes a support unit and a plurality of recesses, the light guiding member is arranged on the support unit, the frame includes a main body and a plurality of coupling portions connected to the main body, the main body and the support unit clamp the light guiding member, the coupling portions are coupled to the recesses; the ribs are arranged on the second face as concentric circles, the ribs partition the second face into a first zone, a second zone, and a third zone, the first zone is circle-shaped, each of the second zone and the third zone is ring-shaped, the second zone is located between the first zone and the third zone; the first zone is flat and smooth, each of the second zone and the third zone has a plurality of the ribs, each of the ribs in the second zone has a rib height vary from a rib height of each of the ribs in the third zone; the LEDs are arranged along the circumferential direction of the light guiding member to be concentric circles; the light guiding member is disc-shaped; the frame is ring-shaped; each of the rib crests has an arc-shaped contour in a radial cross-section of the light guiding member, each of the rib slopes is linear in a radial cross-section of the light guiding member, a ratio of a radius of curvature of the rib crest to the length of each of the rib slopes is ranged 0.8-1.4; the automobile lamp further includes a sealing plug and a lamp cover, the sealing plug is inserted through and positioned to the lamp seat, a wire of the circuit board is inserted through the sealing plug to connect to a power supply, the lamp cover covers the light guiding member and is positioned to the lamp seat; the recesses include three said recesses arranged isometrically, the coupling portions include three said coupling portions arranged isometrically, the support unit includes six first positioning pins, a pair of the first positioning pins is arranged between any two adjacent ones of the recesses along the circumferential direction of the light guiding member, the main body is extended with six second positioning pins, the second positioning pins correspond to the first positioning pins respectively; a ratio of a vertical distance between the first face and the second face to a vertical distance between the first face to the lighting portions along the axial direction of the light guiding member is ranged 0.15-0.3.

6. The automobile lamp of claim 1, wherein when observing along the radial direction of the light guiding member, the LEDs are located closed to a periphery of the second face.

7. The automobile lamp of claim 1, wherein the LEDs are arranged about a central axis and form a plurality of annular layers.

8. The automobile lamp of claim 7, wherein the LEDs are arranged spacedly along both the radial direction and a circumferential direction of the light guiding member.

9. The automobile lamp of claim 1, further including a frame, the lamp seat further having a support portion, the frame being disposed on the support portion to enclose a receiving space between the frame and the support portion, the light guiding member being restricted in the receiving space.

10. The automobile lamp of claim 9, wherein the support portion includes a support unit and a plurality of recesses, the light guiding member is arranged on the support unit, the frame includes a main body and a plurality of coupling portions connected to the main body, the main body and the support unit clamp the light guiding member, the coupling portions are coupled to the recesses.

* * * * *